No. 675,757. Patented June 4, 1901.
W. A. G. SCHÖNHEYDER.
VALVE FOR LIQUIDS.
(Application filed Oct. 25, 1900.)
(No Model.)

UNITED STATES PATENT OFFICE.

WILLIAM A. G. SCHÖNHEYDER, OF CLAPHAM PARK, ENGLAND.

VALVE FOR LIQUIDS.

SPECIFICATION forming part of Letters Patent No. 675,757, dated June 4, 1901.

Application filed October 25, 1900. Serial No. 34,375. (No model.)

*To all whom it may concern:*

Be it known that I, WILLIAM ANTON GOTTLIEB SCHÖNHEYDER, a citizen of Denmark, residing at 4 Rosebery road, Clapham Park, in the county of Surrey, England, have invented a certain new and useful Improvement in Valves for Liquids, (for which I have applied for a patent in Great Britain, dated April 28, 1900, No. 7,914,) of which the following is a specification.

My invention relates to sluice-valves so constructed that when they are worked in closing or opening the passages which they govern their surfaces are moved relatively to those on which they bear, so that there is always a grinding and polishing action which produces uniform wear, making the parts accurately fit and preventing leakage.

I shall describe my invention applied to a sluice-valve, referring to the accompanying drawings.

Figure 2:
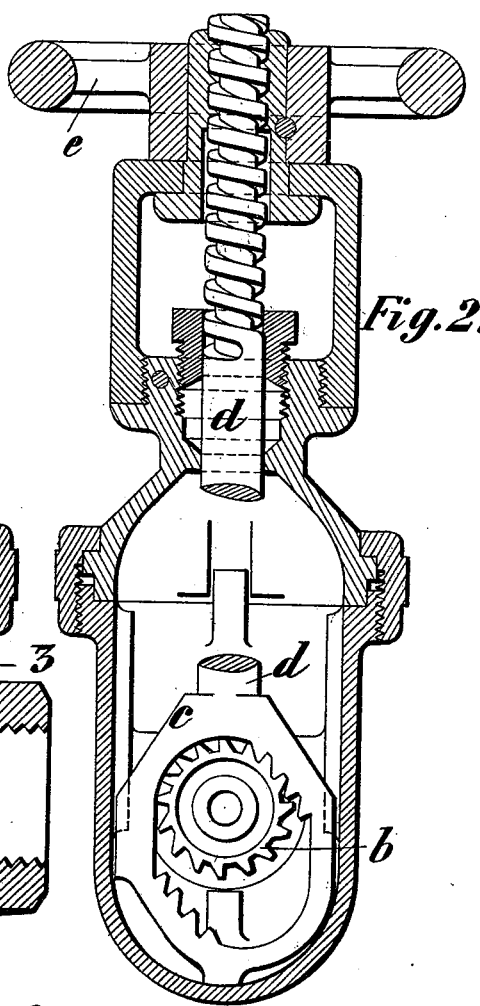
Figure 1:
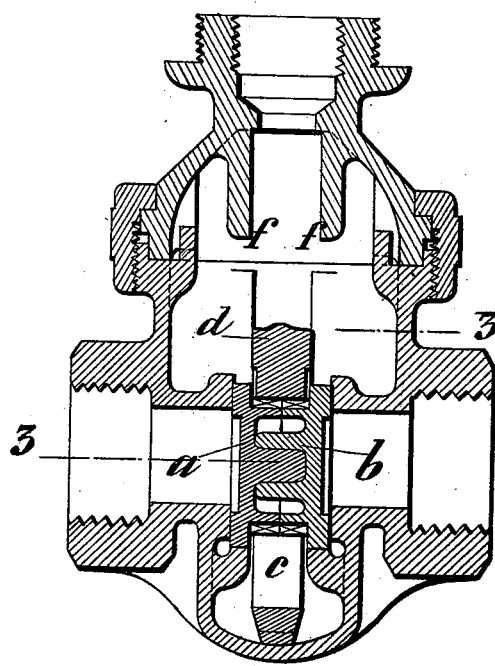
Figure 3:
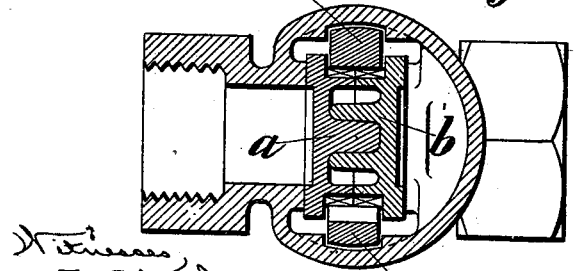

Figures 1 and 2 are vertical sections on planes at right angles to each other. Fig. 3 is a sectional plan on the lines 3 3 of Fig. 1.

The sluice-valve is made in two parts $a$ and $b$, engaging one another back to back, but free to move apart. These parts have teeth around the circumference and are inclosed within a loop $c$ of the rod $d$, this loop having two sets of teeth, the one set adapted to engage with those of the valve when the rod $d$ descends and the other set to engage with those of the valve when the rod ascends. Thus when the valve is moved up or down it is also caused to make a partial rotation, always in the same direction, whereby its faces and those against which it works are rendered always even and smooth, preventing leakage. The rod $d$ is moved up and down by turning a handle-nut $e$, working on a screw-threaded part of the rod. The rod itself is prevented from turning by the sides of its loop $c$ working in recesses at the sides of the valve-casing. Stops $f$ are provided to prevent the valve from being raised so far as to be off the facings against which it works.

Having thus described the nature of this invention and the best means I know of carrying the same into practical effect, I claim—

The herein-described sluice-valve comprising the valve-casing and valve-seat, the valve, the valve-rod and means for connecting said rod and valve, said means being constructed and arranged to cause the valve to make a partial rotation on its seating always in the same direction as the valve is raised and lowered, substantially as described.

In testimony whereof I have hereunto set my hand in presence of two subscribing witnesses.

W. A. G. SCHÖNHEYDER.

Witnesses:
GERALD L. SMITH,
EDWARD GARDNER.